(12) United States Patent
Kameyama (10) Patent No.: US 6,972,793 B1
(45) Date of Patent: Dec. 6, 2005

(54) VIDEO SIGNAL PROCESSING DEVICE AND ITS METHOD

(75) Inventor: Takashi Kameyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/622,949

(22) PCT Filed: Dec. 24, 1999

(86) PCT No.: PCT/JP99/07270

§ 371 (c)(1),
(2), (4) Date: Aug. 24, 2000

(87) PCT Pub. No.: WO00/40037

PCT Pub. Date: Jul. 6, 2000

(30) Foreign Application Priority Data

Dec. 26, 1998 (JP) .................................. 10-376712

(51) Int. Cl.[7] .............................................. H04N 9/64
(52) U.S. Cl. ...................... 348/256; 348/222; 348/234; 348/229.1; 348/255; 348/645
(58) Field of Search ............................ 348/222.1, 649, 348/652, 703, 256, 255, 222, 234–238, 229.1, 348/645, 679

(56) References Cited

U.S. PATENT DOCUMENTS

| 5,124,785 | A | * | 6/1992 | Hirose et al. ................. 348/649 |
| 5,130,786 | A | * | 7/1992 | Murata et al. ............ 375/240.25 |
| 5,296,920 | A | * | 3/1994 | Sakaue et al. ............... 348/675 |
| 5,446,504 | A | | 8/1995 | Wada |
| 5,555,031 | A | * | 9/1996 | Van Rooij .................... 348/645 |
| 5,729,299 | A | | 3/1998 | Suzuki et al. |
| 5,949,482 | A | * | 9/1999 | Kawa ........................ 348/222.1 |
| 6,111,607 | A | * | 8/2000 | Kameyama .................. 348/645 |
| 6,515,700 | B2 | * | 2/2003 | Nakamura et al. ........... 348/645 |
| 2003/0133019 | A1 | * | 7/2003 | Higurashi et al. ........ 348/222.1 |

FOREIGN PATENT DOCUMENTS

| EP | 0 801 509 A2 | 10/1997 |
| EP | 0801509 A2 | * 10/1997 |
| EP | 0 704 132 B1 | 7/1999 |
| WO | WO 95/28796 | 10/1995 |

* cited by examiner

Primary Examiner—Tuan Ho
Assistant Examiner—Gevell Selby
(74) Attorney, Agent, or Firm—Frommer Lawrence & Haug LLP; William S. Frommer; Thomas F. Presson (57) ABSTRACT

The object of the present invention is to improve the quality of picture in the image. According to the present invention, by forming the luminance signal of pixel based on red signal, green signal and blue signal per pixel of video signal by the luminance signal forming means and detecting the saturation per pixel of the video signal by the detection means, and compression processing the red signal, green signal and blue signal of the corresponding pixel without changing the hue and saturation but changing the brightness of pixel based on the luminance signal and the detection result of the saturation of the corresponding pixel by the compression processing means, and by controlling signal levels of red signal, green signal and blue signal compression processed by the compression processing means as necessary without changing hue and luminance but changing saturation of pixel by the control means, the red signal, green signal and blue signal can be compression processed with greatly reduced color fading of pixels and the image can be prevented from losing the chromatic tone. And thus, the video signal processing device and its method capable of improving the quality of picture in the image can be realized.

10 Claims, 6 Drawing Sheets

VIDEO SIGNAL PROCESSING DEVICE AND ITS METHOD

TECHNICAL FIELD

The present invention relates to a video signal processing device and can be suitably applied to a camera signal processing device provided in the video camera for example.

BACKGROUND ART

Heretofore, as this type of camera signal processing device, there has been a device that makes signal levels to be stored within the dynamic range of television standards from the huge dynamic range of natural light by compression processing signal levels of red signal, green signal and blue signal per pixel obtained by photographing a subject via the picture shooting unit (hereinafter referred to as red level, green level, blue level), i.e., the knee processing has been conducted.

At this point, in each picture element as shown in FIG. 5(A)~(E), red R, green G and blue B are distributed spreading around the brightness (luminance) W. And in the case of achromatic color, red level, green level, blue level and the signal level of luminance signal (hereinafter referred to as luminance level) become equal (FIG. 5(A)).

Figure 5:
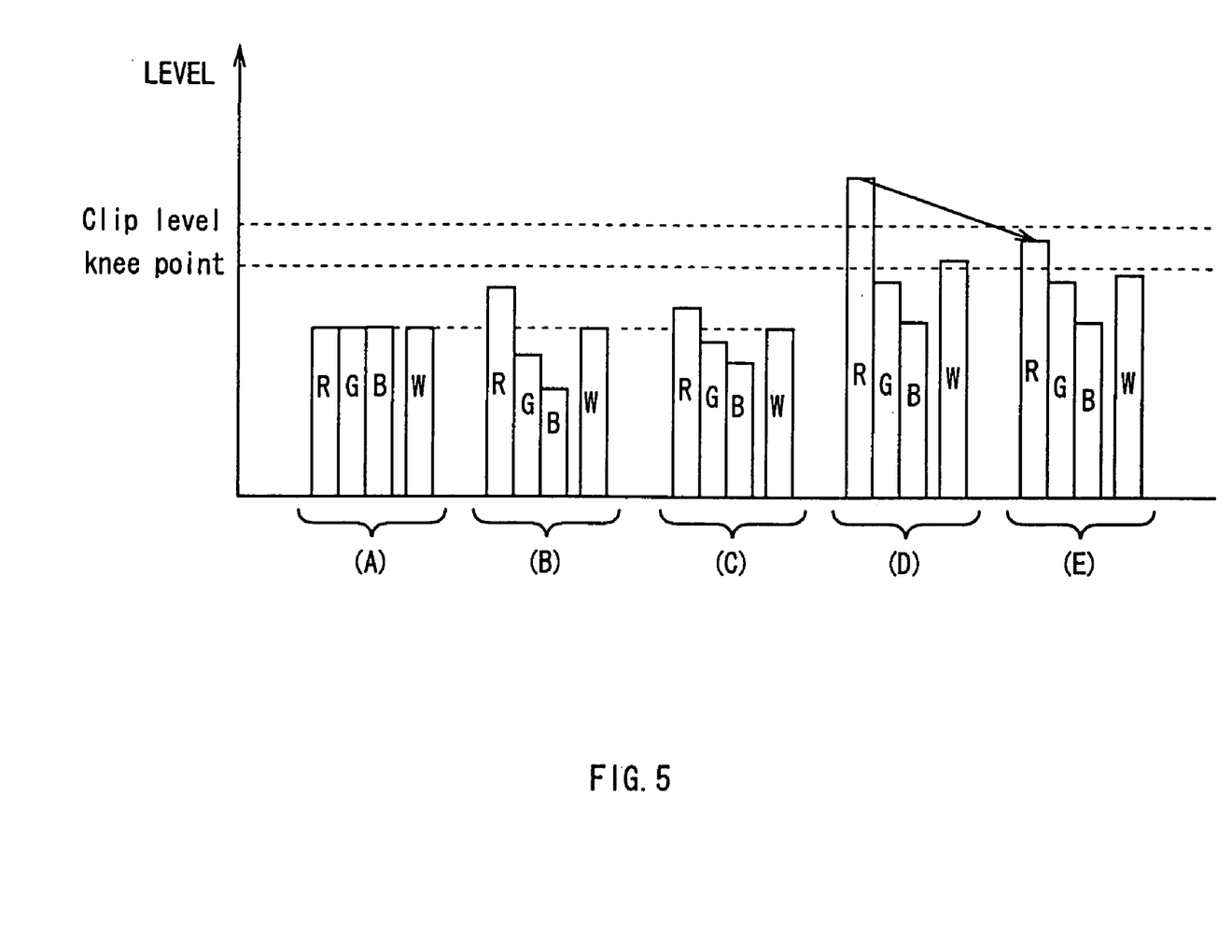
FIG. 5 is a brief linear diagram illustrating the conventional knee processing.

Furthermore, in each picture element, in the case of chromatic color, the difference occurs among red level, green level and blue level. And of said red level, green level and blue level at least one level exceeds the luminance level and at least one level of these red, green and blue levels falls short of the luminance level.

Moreover, the ratio of red level, green level and blue level shows chromatic color-level (hereinafter referred to as hue) based on 5 colors, i.e., red, yellow, green, blue and purple, and intermediate colors of these 5 colors, i.e., yellow red, yellow green, blue green, blue purple and red purple, and the part of red level, green level and/or blue level exceeding the luminance level shows the saturation, that is the degree of color brightness (FIG. 5(B)).

In this connection, in the picture element as shown in FIG. 5(B), when the red level, green level and blue level are constricted with respect to the luminance level, the part of red level, green level and/or blue level exceeding the luminance level become narrow and color fades with the saturation dropping, and if the saturation continues to fall, finally it becomes achromatic color such as shown in FIG. 5(A).

Furthermore, for example, if the aperture is opened at the photo shooting unit under the condition shown in FIG. 5(B), hue and saturation would not change but red level, green level and blue level increase with the luminance level (FIG. 5(D)).

As the knee processing, as shown in FIG. 5(D), in the case where at least one in the red level, green level and blue level exceeds the reference level showing the upper limit of dynamic range of the television signal standards (hereinafter referred to as clip level), there is a method to reduce the red level, green level and/or blue level exceeding this clip level to said clip level (FIG. 5(E)) by controlling the gains of red signal, green signal and blue signal.

However, according to such knee processing method, since the ratio of red level, green level and blue level change before and after this processing, skin color of a person changes from skin color to yellowish color by the knee processing. And the image having chroma that gives viewers the sense of incompatibility will be formed.

Therefore, in recent years as the camera signal processing device, there are devices that utilize the compression processing according to the luminance (hereinafter referred to as luminance knee processing) and the adjustment (aperture) processing according to the saturation (hereinafter referred to as saturation knee processing) when knee processing the red signal, green signal and blue signal.

In practice, if red signal, green signal and blue signal are multiplied by the gain to reduce the luminance level (hereinafter referred to as brightness transfer gain) respectively, the red level, green level and blue level can be reduced with the luminance level not changing the hue and saturation.

Figure 6:
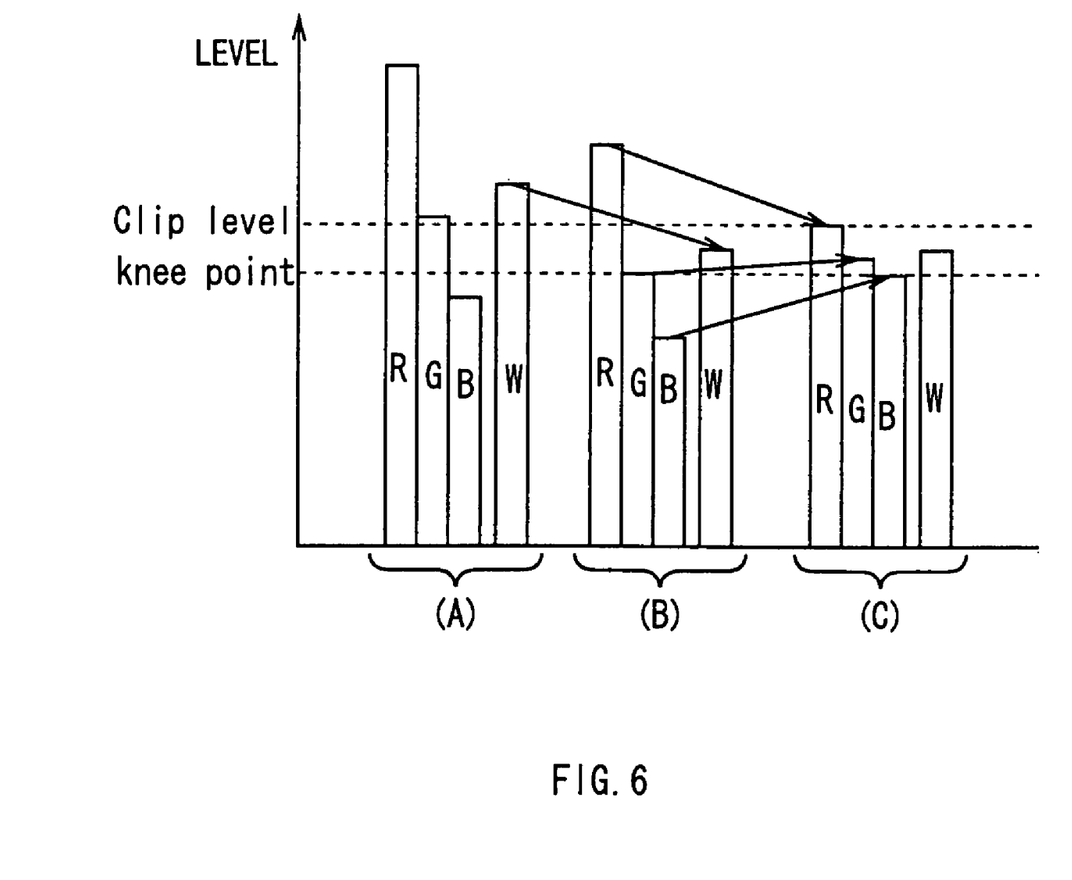
FIG. 6 is a brief linear diagram illustrating the luminance knee processing and the saturation knee processing.

Accordingly, in the camera signal processing device as shown in FIG. 6(A)~(C), if at least one level in the red level, green level and blue level exceeds the clip level with the luminance level (FIG. 6(A)), firstly the camera signal processing device conducts the luminance knee processing and then multiplies the red signal, green signal and blue signal by the brightness transfer gain (hereinafter referred to as the first brightness transfer gain) respectively so that the luminance level is reduced to the predetermined level, that is a little lower than the clip level. And with this arrangement, the camera signal processing device reduces the red level, green level and blue level with the luminance level (FIG. 6(B)).

In such camera signal processing device, in the case where at least one level out of red level, green level and blue level exceeds the clip level even though the luminance knee processing has been executed, the saturation knee processing is continuously executed, and the saturation is reduced by controlling the gain of red signal, green signal and blue signal so that the red level, green level or blue level having the highest level at that moment will be reduced to the clip level. And thus, the knee processing can be executed (FIG. 6(C)).

In the camera signal processing device according to the construction described above, the red level, green level and blue level can be changed without changing the ratio by compression processing red signal, green signal and blue signal according to the luminance and saturation. And thus, this has an advantage that the red signal, green signal and blue signal can be knee processed under the condition in which hue is kept.

However, in this camera signal processing device, when conducting the luminance knee processing, the red level, green level and blue level were also reduced by lowering the luminance level to the prescribed level at which a space between the luminance level and the clip level became comparatively narrow regardless of the saturation of pixel.

Accordingly, in the case where the saturation of pixel is low, since the part of red level, green level or blue level exceeding the luminance level is comparatively small, even if the upper limit of the red level, green level or blue level would be controlled by the saturation knee processing, the saturation of this pixel would not be changed and thus, chromatic color fading can be prevented.

However, at the time when the gray level of pixel is dark, the part of red level, green level or blue level exceeding the luminance level is comparatively large, and if the upper limit of the red level, green level or blue level is controlled by the clip level according to the saturation knee processing, the saturation of this pixel drops extremely and chromatic color fades. And thus, this caused the problem in losing chromatic tone of the image and worsening the quality of picture.

DISCLOSURE OF THE INVENTION

The present invention has been done considering the above points and is proposing a video signal processing device and its method capable of improving the quality of picture.

To obviate such problems according to the present invention, in the video signal processing device for processing in order to keep signal levels of the red signal, green signal and blue signal per pixel of video signal under the predetermined standard level, we provide the luminance signal forming means for forming luminance signal of said pixel based on red signal, green signal and blue signal per pixel of video signal; the detection means for detecting the saturation per pixel of the video signal; the compression processing means for compression processing the red signal, green signal and blue signal of the corresponding pixel without changing hue and saturation of the pixel but changing the luminance based on the luminance signal formed by the luminance signal forming means and the corresponding detection result obtained by the detection means, and the control means for controlling signal levels of red signal, green signal and blue signal compression processed by the compression processing means as required not changing the hue and luminance of the pixel but changing the saturation.

As a result, red signal, green signal and blue signal can be compression processed with tremendously reduced color fading of pixels, and the loss of chromatic tone in the image can be prevented.

Furthermore, according to the present invention, in the video signal processing method for processing in order to maintain signal levels of red signal, green signal and blue signal per pixel of said video signal under the predetermined reference level, we provide the first step for detecting the saturation per pixel of the video signal as well as forming the luminance signal of said pixel based on the red signal, green signal and blue signal per pixel of the video signal; the second step for compression processing red signal, green signal and blue signal of the corresponding pixel by only changing the luminance but not changing the hue and saturation of the pixel based on the luminance signal obtained at the first step and the corresponding detection result; and the third step for controlling signal levels of red signal, green signal and blue signal compression processed at the second step as required only changing the saturation but not changing the hue and luminance of pixels.

As a result, red signal, green signal and blue signal can be compression processed with tremendously reduced chromatic color fading of pixels and thus, the loss of color tone in the image can be prevented.

BEST MODE FOR CARRYING OUT THE INVENTION

The present invention will be described in detail with reference to the accompanying drawings.

(1) Principle of Knee Processing according to the Present Invention

Figure 1:
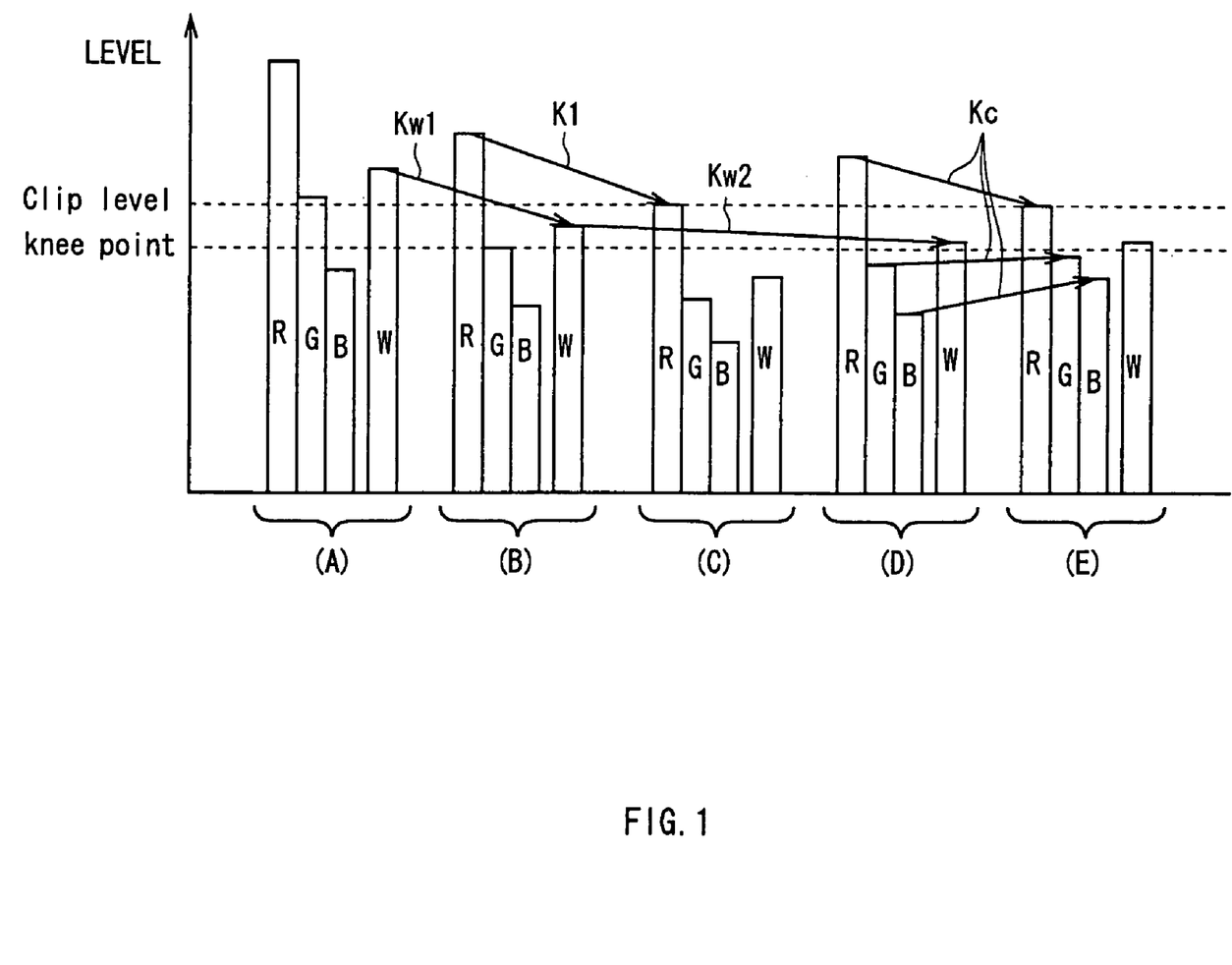
FIG. 1 is a brief linear diagram illustrating the principle of the knee processing according to the embodiment of the present invention.

As shown in FIGS. 1(A)~(E), according to the knee processing, firstly, the red signal, green signal and blue signal are multiplied by the first brightness transfer gain Kw1 respectively in the same manner as the luminance knee processing in the conventional knee processing, and the red level, green level and blue level will be reduced with the luminance level (FIG. 1(A)).

Then, in the case where either one of red level, green level and blue level exceeds the clip level even though the luminance knee processing is conducted, the temporary brightness transfer gain necessary for decreasing the red level, green level or blue level having the highest level at this moment (hereinafter referred to the first temporary brightness transfer gain) K1 will be obtained (FIG. 1(C)).

Then, in the case where the saturation of pixel is low, the red level, green level and blue level will be changed by lowering the saturation identical to the saturation knee processing in the conventional knee processing described above based on the first temporary brightness transfer gain K1.

On the other hand, at the time when the saturation of pixel is high, after the luminance level is lowered a little by the luminance knee processing again (FIG. 1 (D)) dividing the first temporary brightness transfer gain K1 into the luminance knee processing and the saturation knee processing. And then, red level, green level and blue level will be changed by lowering the saturation according to the saturation knee processing.

Accordingly, if the amount of reducing the luminance level would be changed according to the saturation of pixel, in the case where the saturation of pixel is low, the gap between the luminance level and the clip level would be made approximately the same as in the case of conventional luminance knee processing and the change of saturation can be prevented.

Furthermore, when the luminance of pixel is high, by widening the gap between the luminance level and the clip level wider than the conventional luminance knee procesing (FIG. 1(E), the substantial reduction in the saturation of pixel is prevented and chromatic color fading can be remarkably controlled. And in this case, further reduced luminance level as compared with the conventional luminance knee processing will be visually supplemented by the saturation that prevented the luminance level from further reduction. And thus, it is considered that the loss of chromatic tone of the image can be prevented.

In practice, in such knee processing, when luminance knee processing, the brightness transfer red signal SR2 is formed multiplying the red signal SR1 by the first brightness transfer gain Kw1 as shown in the following EQUATION:

$$SR2 = Kw1 \qquad (1)$$

The brightness transfer green signal SG2 is formed multiplying the green signal SG1 by the first brightness transfer gain Kw1 as shown in the following EQUATION:

$$SG2 = Kw1 \cdot SG1 \qquad (2)$$

Furthermore, as shown in the following EQUATION, the brightness transfer blue signal SB2 is formed multiplying blue signal SB1 by the first brightness transfer gain Kw1.

$$SB2 = Kw1 \cdot SB1 \quad (3)$$

By forming the luminance transfer blue signal SB2 as described above, the luminance level can be reduced up to a little lower than the predetermined level and also red level, green level and blue level can be reduced without changing hue and saturation.

According to the luminance knee processing described above, if either the red level, green level or blue level exceeds the clip level, making the red signal, green signal or blue signal having the highest level to be MAX (SR2, SG2, SB2) and the value of clip level to be CL, the first temporary brightness transfer gain K1 will be obtained as follows:

$$K1 = \frac{CL}{MAX(SR2, SG2, SB2)} \quad (4)$$

As shown in the above EQUATION, the first temporary brightness transfer gain K1 is obtained by dividing the value of clip level by the red signal, green signal or blue signal having the highest level.

At this point, the first temporary brightness transfer gain K1 shows how much the red level, green level or blue level having the highest level exceeds the clip level, that is to say, approximate amount that the red level, green level or blue level having the highest level exceeds the predetermined luminance level, i.e., this shows the saturation of pixel.

Accordingly, in this knee processing, the brightness transfer gain for reducing the luminance level a little when the saturation of pixel is high (hereinafter referred to as the second brightness transfer gain) Kw2 is set as follows based on the first temporary brightness transfer gain K1.

$$Kw2 = (1-K1)Kadj + K1 \quad (5)$$

In this case, making Kadj as the brightness transform coefficient and selecting optionally between "0" and "1", the second brightness transfer gain Kw2 can be selected optionally between the first temporary brightness transfer gain K1 and "1".

More specifically, according to this EQUATION (5), if the brightness transform coefficient is selected to "0" the red level, green level and/or blue level exceeding the clip level can be reduced to said clip level without changing the hue and saturation based on only the first tentative brightness transfer gain K1, and the brightness level can be further reduced from the predetermined level that is lower than the clip level.

Furthermore, if the brightness transform coefficient is increased successively from "0" the amount to lower the red level, green level and blue level can be reduced with the luminance level, and also if the brightness transform coefficient is selected to "1", the red level, green level and blue level can be fixed as it is with the brightness level.

Accordingly, provided that this brightness transfer gain Kw2 is used, even though the amount to reduce the red level, green level and blue level varies a little with the brightness level depending upon how the brightness transform coefficient is selected, the first tentative brightness transfer gain K1 changes corresponding to the saturation of pixel. Thus, in the case where said saturation is high, the value of this second brightness transfer gain Kw2 becomes large and the gap between the brightness level and the clip level can be widened. And in the case where said saturation is low, the value of this second brightness transfer gain Kw2 becomes small, and thus, the gap between the luminance level and the clip level can be kept closer to the gap between the brightness level and the clip level in the luminance knee processing of the conventional knee processing.

In order to execute the knee processing actually in the camera signal processing device, firstly, the first brightness transfer gain Kw1 is multiplied by the second brightness transfer gain Kw2 shown in the EQUATION (5) as the luminance knee processing.

$$Kw3 = Kw1 \cdot Kw2 \quad (6)$$

And as shown above, the overall brightness transfer gain (hereinafter referred to as the third brightness transfer gain) Kw3 will be obtained, and in utilizing this, the luminance knee processing will be executed all at once.

In this connection, substitute EQUATIONS (4) and (5) described above into EQUATION (6), the following EQUATION exists:

$$Kw3 = (Kw1-K2)Kadj + K2 \quad (7)$$

Then, the third brightness transfer gain Kw3 can be transformed as shown in the above EQUATION.

In this case, K2 contained in the right side of the third brightness transfer gain Kw3 can be expressed as follows:

$$K2 = \frac{CL}{MAX(SR1, SG1, SB1)} \quad (8)$$

As shown above, the signal having the maximum level in the red signal, green signal and blue signal before the luminance knee processed to be MAX (SR1, SG1, SB1), and the value of clip level can be obtained dividing by the red signal, green signal and blue signal having the maximum level. And the tentative brightness transfer gain necessary for reducing the maximum red level, green level or blue level to the clip level (hereinafter referred to as the second temporary brightness transfer gain), i.e., this shows the saturation of pixel.

On the other hand, according to the saturation knee processing, the remaining gain, the second brightness transfer gain Kw2 is subtracted from the first temporary brightness modulation gain K1 (hereinafter referred to as the saturation transfer gain) to be Kc, the brightness transfer red signal obtained by the luminance knee processing to be SR3, and the transformed luminance signal obtained by said luminance knee processing to be Wn, the following EQUATION will be obtained.

$$SR4 = (SR3-Wn)Kc + Wn \quad (9)$$

As shown in EQUATION (9), the saturation transfer red signal SR4 that is modified from the red level is formed by adding the transformed luminance signal to the result obtained by multiplying the difference between the brightness transfer red signal and the transformed luminance signal by the saturation transfer gain.

Furthermore, if the brightness transfer green signal obtained by the luminance knee processing is taken to be SG3, then the following EQUATION exists.

$$SG4 = (SG3-Wn)Kc + Wn \quad (10)$$

As shown in EQUATION (10), the saturation transfer green signal SG4 that is modified green level will be formed by adding the transformed luminance signal to the multiplication result that is obtained by multiplying the difference between the brightness transfer green signal and the transformed luminance signal by the saturation transfer gain.

Furthermore, if the brightness transfer blue signal obtained by the luminance knee processing is taken to be SB3, then the following EQUATION exists.

$$SB4 = (SB3 - Wn)Kc + Wn \quad (11)$$

As shown in EQUATION (11), the saturation transfer blue signal B3 in which the blue level is modified will be formed by adding the transformed luminance signal to the result obtained by multiplying the difference between the brightness transfer blue signal and the transformed luminance signal by the saturation transfer gain.

In this saturation knee processing, it is clear from these EQUATIONS (9), (10) and (11), by using the difference between the brightness transferred signal, brightness transfer green signal and the brightness transfer blue signal to which "+" or "−" showing how much the brightness transfer red signal, brightness transfer green signal and the brightness transfer blue signal are large or small with respect to the transformed luminance signal, the red level, green level and blue level will be constricted to the brightness level without changing the hue and luminance of the red level, green level and blue level, and of these red level, green level and blue level, the highest level can be reduced to the clip level.

In this connection, where the luminance signal before the luminance knee processed to be Wm, the following EQUATION exists:

$$Wm = 0.59SG1 + 0.30SR1 + 0.11SB1 \quad (12)$$

As shown in EQUATION (12), since the luminance signal before luminance knee processed Wm can be obtained by adding up the result obtained by multiplying the red signal, green signal and blue signal by the predetermined constant respectively, the transformed luminance signal contained in the EQUATIONS (9), (10) and (11) can be expressed as follows:

$$Wn = Wm \cdot Kw3 \quad (13)$$
$$= (0.59SG1 + 0.30SR1 + 0.11SB1) \cdot w3$$

As it is clear from the above EQUATION, the transformed luminance signal Wn can be obtained by multiplying the luminance signal by the third brightness transfer gain Kw3.

Moreover, the saturation transfer gain Kc can be expressed as follows:

$$Kc = \frac{CL - Wn}{MAX(SR1, SG1, SB1) \cdot Kw3 - Wn} \quad (14)$$

As shown in the above EQUATION, the saturation transfer gain Kc can be obtained by dividing the difference between the clip level value and the transformed luminance signal by the difference between the brightness transfer red signal, brightness transfer green signal or brightness transfer blue signal having the maximum level and said transformed luminance signal.

Thus, in this knee processing, by changing this third brightness transfer gain Kw3 corresponding to the saturation of pixel and using this third brightness transfer gain Kw3 and saturation transfer gain Kc as necessary, the red signal, green signal and blue signal can be compression processed with greatly reduced color fading when the saturation of pixel is high.

Figure 2:
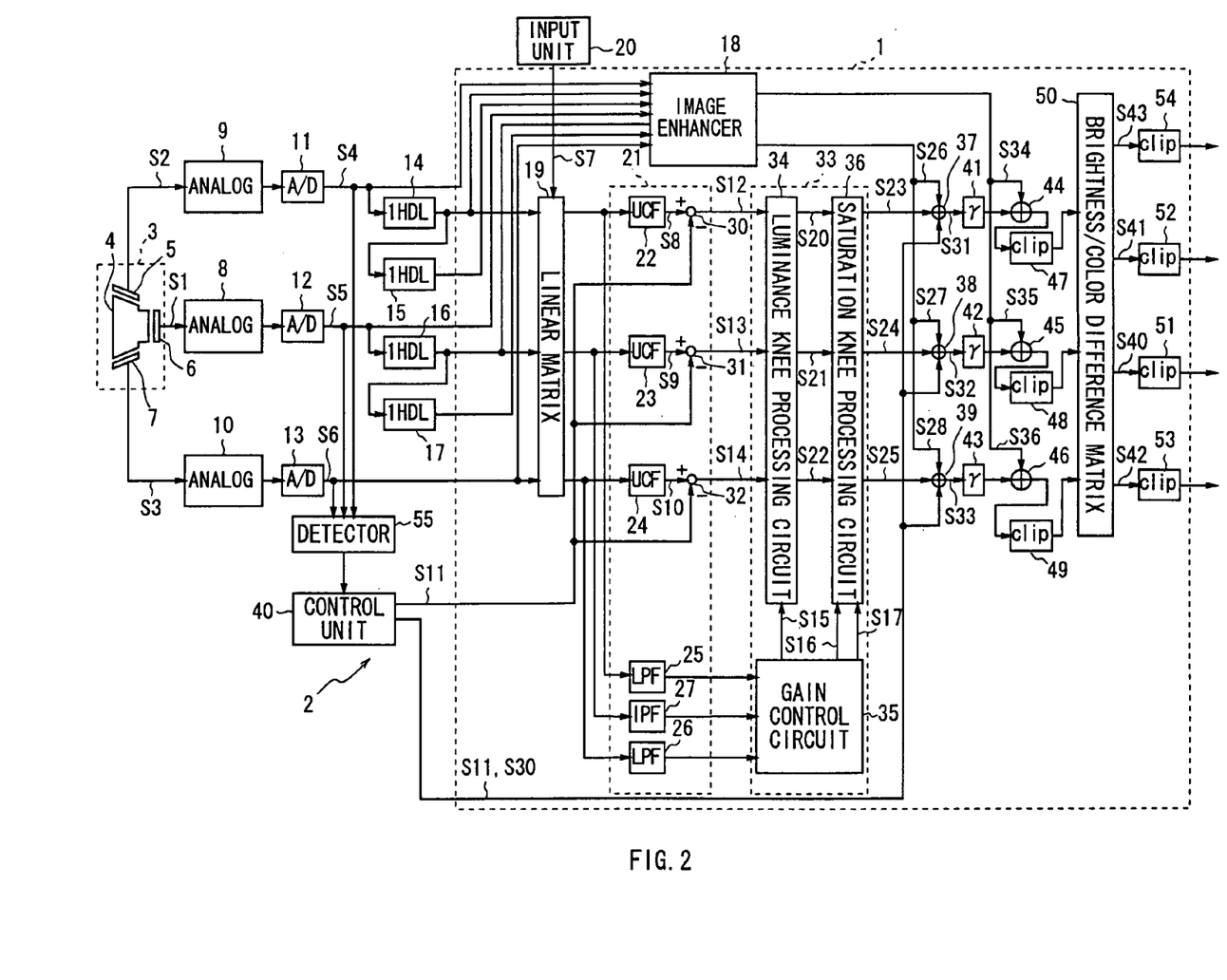
FIG. 2 is a block diagram showing the construction of a video camera according to the embodiment of the present invention.

(2) Construction of Camera Signal Processing Device 1 according to the Present Invention At this point, FIG. 2 shows a video camera 2 equipped with a camera signal processing device 1 which is capable of executing the knee processing described above. And by capturing an optical image of the subject into a prism 4 of the photo shooting unit 3, this optical image is separated into red element, green element and blue element and focussed on the light receiving surface of the corresponding first~the third solid state imaging device.

In the first~third solid state devices 5~7, the red element, green element or blue element of the optical image focussed on the light receiving surface are photoelectrically transformed per pixel. And thus, the second solid state imaging device 6 transmits the resultant green signal S1 obtained to the corresponding second analog processing circuit 8 at the predetermined first transmission rate. And at the same time, the first and the third solid state imaging devices 5 and 7 transmit red signal S2 and green signal S3 obtained delaying the phase by a half pixel respectively to the corresponding first or the third analog processing circuit 9 or 10.

The first~the third analog processing circuits 8~10, after applying the predetermined analog processing, such as white balance adjusting processing or amplification processing to the red signal S2, green signal S1 or blue signal S3 supplied from the first~the third solid state imaging devices 5~7, transmit these to the corresponding first the third analog/digital converters 11~13 respectively.

The first~the third analog/digital converters 11~13 convert red signal S2, green signal S1 or blue signal S3 supplied from the first~the third analog processing circuits 8~10 to digital according to the D1 format of the digital signal standard at the sampling frequency of the corresponding first~the third solid state imaging devices 5~7 and transmit the resultant coded red signal S4, green signal S5 or blue signal S6 to the image enhancer 18 and the linear matrix circuit 19 as demanded via the delay circuits 14~17.

The linear matrix circuit 19 is supplied with color control signal S7 for controlling color from the input unit 20 arranged on the panel surface of the video camera 2. And this linear matrix circuit 19, after correcting the color reproducibility with respect to the red signal S4, green signal S5 and blue signal S6 given from the first~the third analog/digital converters 11~13, transmit these to the corresponding first~third up-convert filters 22~24 and low-pass filters 25 and 26, and an interpolation filter 28 of the filter processing unit 21 respectively.

The first~the third up-convert filters 22~24 take out low frequency element by controlling the band keeping the red signal S4, green signal S5 or blue signal S6 given from the linear matrix in phase, and output low band red signal S8, low band green signal S9 or low band blue signal S10 formed of low frequency elements thus taken out to the corresponding first~the third subtracters 30~32 respectively at the second transmission rate that is approximately twice much of the first transmission rate.

The first~the third subtracters 30~32, by removing a black code signal S11 that becomes the reference level of code signal from the low band red signal S8, low band green signal S9 of low band blue signal S10 supplied from the first third up-convert filters 22~24, transmit the low band red signal S12, low band green signal S13 and low band blue signal S14 with the stimulus value relative to "0" level to the luminance knee processing circuit 34 of the knee processing unit 33.

At this point, low-pass filters 25 and 26 and the interpolation filter 27, keeping the red signal S4, green signal S5 and blue signal S6 given from the linear matrix circuit 19 in phase, transmit to the gain control circuit 35.

Furthermore, the gain control circuit 35 transmits the third brightness transfer gain to the luminance knee processing circuit 34 as the third brightness transfer gain signal S15 upon forming the third brightness transfer gain (Kw3) and transformed luminance signal (Wn) and saturation transfer gain (Kc) based on these red signal S4, green signal S5 and blue signal S6, and outputs the transformed luminance signal S16 and saturation transfer gain signal S17 formed of saturation transfer gain to the saturation knee processing circuit 36.

With the above arrangement, the luminance knee processing circuit 34 applies the luminance knee processing to the low band red signal S12, low band green signal S13 and low band blue signal S14 given from the first~the third subtracters 30~32 based on the third brightness transfer gain signal S15 supplied from the gain control circuit 35, and transmits the resultant brightness transfer red signal S20, luminance transfer green signal S21 and brightness transfer blue signal S22 to the saturation knee processing circuit 36.

Then, the saturation knee processing circuit 36 applies the saturation knee processing to the brightness transfer red signal S20, brightness transfer green signal S21 and brightness transfer blue signal S22 given from the luminance knee processing circuit 34 based on the transformed luminance signal S16 and saturation transfer gain signal S17 supplied from the gain control circuit 35, and transmits the resultant saturation transfer red signal S23, saturation transfer green signal S24 and saturation transfer blue signal S25 to the corresponding first~the third adders 37~38 respectively.

At this point, the first~the third adders 37~39 are supplied with a high band red signal S26, high band green signal S27 or high band blue signal S28 obtained by applying the edge enhancement processing to the high band element taken out from the red signal S4, green signal S5 and blue signal S6 from the image enhancer 18, and also supplied with a pedestal signal S30 from the control unit so the black code signal S11 and the level of said black code signal S11 can be controlled from the outside.

Thus, the first~the third adders 37~39 add up black code signal S11 and said black code signal S30 and the corresponding high band red signal S26, high band green signal S27 or high band blue signal S28 to the saturation transfer red signal S23, saturation transfer green signal S24 or saturation transfer blue signal S25 given from the saturation knee processing circuit 36, and after gamma correcting the resultant coded red signal S31, green signal S32 or blue signal S33 via the corresponding first ~the third gamma correction circuits 41~43 respectively, transmit to the fourth~the sixth adders 44~46.

The fourth the sixth adders 44~46 are supplied with the high band red signal S34, high band green signal S3 or high band blue signal S36 obtained by applying the edge enhancement processing to the high band element taken out from the red signal S4, green signal S5 and blue signal S6 from the image enhancer 18, and after adding up the corresponding high band red signal S34, high band green signal S35 or high band blue signal S36 to the red signal S31, green signal S32 or blue signal S33 given from the first~the third gamma correction circuits 41~43, transmit these to the luminance/color difference matrix circuit 50 via the first~the third clip circuits 47~49 upon clipping these according to D1 format.

The luminance/color difference matrix circuit 50 forms a luminance signal (Y) S40, the first color difference signal (R-Y) S41 and the second color difference signal (B-Y) S42 based on the red signal S31, green signal S32 and blue signal S33 given via the first~the third clip circuits 47~49, and after clipping these via the corresponding fourth~the sixth clip circuits 51~53 respectively according to D1 format, outputs these. And also the luminance/color difference matrix circuit 50 forms the third color difference signal (VF-Y) S43, and after clipping this via the seventh clip circuit 54 according to the D1 format, outputs to a view finder (not shown in Fig.).

In this connection, in this camera signal processing device 1, the image enhancer 18 attenuates the high frequency element of the high band red signal S26, the high band green signal S27 or the high band blue signal S28 to be transmitted to the first~the third adders 37~37 a little more as compared with the high band red signal S34, the high band green signal S35 or the high band blue signal S36 to be transmitted to the fourth~the sixth adders 44~46.

Thus, in the case of applying the gamma correction to the corresponding red signal S31, green signal S32 or blue signal S33 in the first~the third gamma correction circuits 41~43, the occurrence of distortion in low frequency elements of the red signal S31, green signal S32 or blue signal S33 caused by aliasing distortion can be prevented.

Furthermore, in this video camera 2, red signal S4, green signal S5 and blue signal S6 obtained at the first~the third analog/digital converters 11~13 are captured into the detector 55. And in the detector 55, the red level, green level and blue level of these red signal S4, green signal S5 and blue signal S6 are detected and the detection result will be transmitted to the control unit 40. Thus, the control unit 40 is capable of adjusting the aperture in the photo shooting unit 3 based on the detection result given from the detector 55.

(3) Construction of Knee Processing Unit

Figure 3:
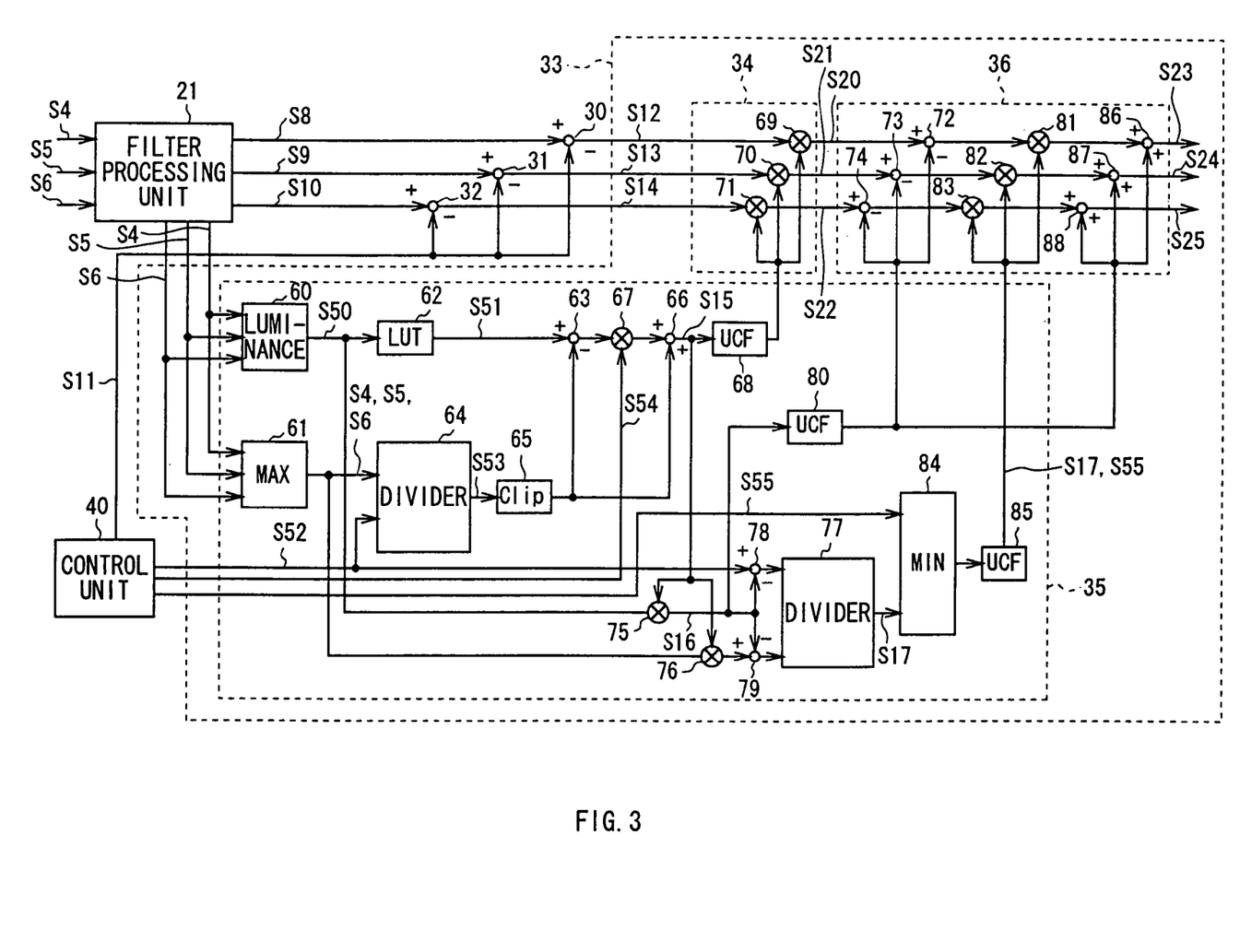
FIG. 3 is a block diagram showing the circuit construction of a knee processing unit.

At this point, in the knee processing unit 33, in practice as shown in FIG. 3, the red signal S4, green signal S5 and blue signal S6 put out from the filter processing unit 21 (low-pass filters 15 and 16, an interpolation filter 27) in phase are captured into the luminance detection circuit 60 and the maximum value detection circuit 61 of the gain control circuit 35.

The luminance detection circuit 60 forms luminance signal (Wm) S50 by conducting the arithmetic processing shown in EQUATION (12) based on the red signal S4, green signal S5 and blue signal S6 given from the filter processing unit 21 and transmits this to the look-up table 62.

Figure 4:
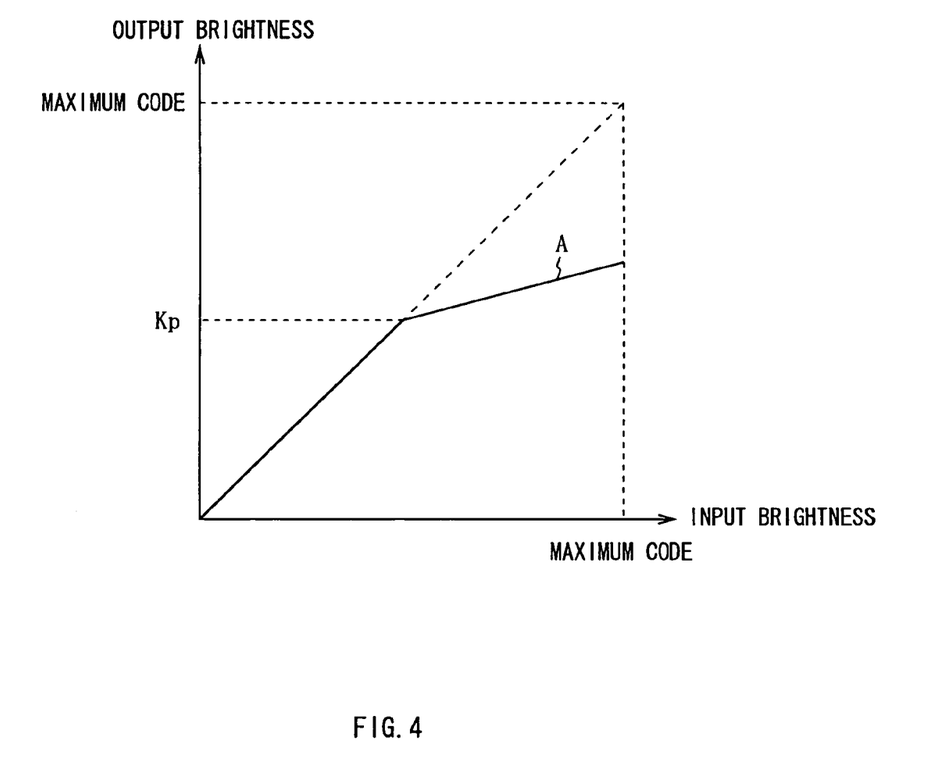
FIG. 4 is a graph showing the characteristic curve of the first brightness transfer gain memorized in the look-up table.

The first brightness transfer gain (Kw1) information set in advance corresponding to the level of luminance signal S50 described above, such as shown in the characteristic curve A of FIG. 4 is memorized in the internal signal table of the look-up table 62. And when the luminance signal S50 is given from the luminance detection circuit 60, the look-up table 62 reads out corresponding first brightness transfer gain from the signal table and transmits this to the fourth subtracter 63 as the first brightness transfer gain signal S51.

In this connection, in the characteristic curve A of this first brightness transfer gain, the position of knee point Kp can be optionally selected and thus, the dynamic range of input signal can be converted by changing the slope of this characteristic curve A.

On the other hand, the maximum value detection circuit 61 detects the signal having the maximum level from among red signal S4, green signal S5 and blue signal S6 and transmits said detected red signal S4, green signal S5 or blue signal S6 having the maximum level to the first divider 64.

The first divider 64 is supplied with a clip level signal S52 showing the value of clip level from the control unit 40, and this first divider 64 calculates the second temporary brightness transfer gain (K2) by dividing this clip level signal S52 by the red signal S4, green signal S5 or blue signal S6 with the maximum level given from the maximum value detection circuit 61 by conducting the arithmetic processing shown in EQUATION (8), and outputs this to the eighth clip circuit 65 as a temporary brightness transfer gain signal S53.

In this case where the value of temporary brightness transfer gain signal S53 given from the first divider 64 is smaller than "1", the eighth clip circuit 65 transmits this to the fourth subtractor 63 and the seventh adder 66 as it is. However, if the value of said temporary brightness transfer gain signal S53 is larger than "1", the eighth clip circuit 65 clips this to the value "1" and transmits to the fourth subtracter 63 and the seventh adder 66.

More specifically, at a later stage of this eighth clip circuit 65, if the value of temporary brightness transfer gain signal S53 is smaller than "1", the clip level of red level, green level or blue level having the maximum level is larger than the clip level and then the processing to reduce the level will be conducted. On the other hand, if the value of temporary brightness transfer gain signal S53 is larger than "1", the processing to increase the level will be conducted even though the red level, green level or blue level having the maximum level is smaller than the clip level already.

Furthermore, in the case where the value of temporary brightness transfer gain signal S53 is "1", the red level, green level or blue level having the maximum level is the same level as the clip level and this level will be fixed as it is.

Accordingly, in this eighth clip circuit 65, if the value of temporary brightness transfer gain signal S53 is clipped to the value "1" when this value is larger than "1", the accidental execution of processing to disturb the chromatic tone by increasing the saturation can be prevented.

At this point, the arithmetic processing described above in EQUATION (7) will be conducted in the fourth subtracter 63, the first multiplier 67 and the seventh adder 66.

More specifically, the fourth subtracter 63 subtracts the temporary brightness transfer gain signal S53 given from the eighth clip circuit 65 from the first brightness transfer gain signal S51 given from the look-up table 62 and transmits the subtraction result to the first multiplier 67.

Then, the first multiplier 67 is supplied with a luminance transform coefficient from the control unit 40 as the luminance transform coefficient signal S54. The first multiplier 67 multiplies the subtraction result given from the fourth subtracter 63 by this luminance transform coefficient signal S54 and transmits the resultant to the seventh adder 66.

The seventh adder 66 calculates the third brightness transfer gain (Kw3) by adding the temporary brightness transfer gain signal S53 given from the clip circuit 65 to the multiplication result given from the first multiplier 67, and transmits this to the second~the fourth multipliers 69~71 of the luminance knee processing circuit 34 as the third brightness transfer gain signal S15 at the second transmission rate via the fourth up-convert filter 68.

The second~the fourth multipliers 69~71 multiply the low band red signal S12, low band green signal S13 or low band-blue signal S14 given from the filter processing unit 21 (the first~the third up-convert filters 22~24) via the first~the third subtracters 30~32 by the corresponding third brightness transfer gain signal S15 given from the fourth up-convert filter 68 respectively, and output the resultant brightness transfer red signal S20, brightness transfer green signal S21 or brightness transfer blue signal S22 to the corresponding fifth~the seventh subtracters 72~74 of the saturation knee processing circuit 36 respectively.

At this point, the luminance detection circuit 60 transmits the luminance signal S50 to the fifth multiplier 75. Moreover, the maximum value detection circuit 61 transmits the red signal S4, green signal S5 or blue signal S6 having the maximum level to the sixth multiplier 76. Furthermore, the seventh adder 66 outputs the third brightness transfer gain signal S15 to the fifth multiplier 75 and the sixth multiplier 76.

Then, from the fifth and sixth multipliers 75 and 76 to the second divider 77, the arithmetic processing as shown in EQUATION (14) will be executed.

More specifically, the fifth multiplier 75 calculates the transformed luminance signal (Wn) described above by multiplying the luminance signal S50 given from the luminance detection circuit 60 by the third brightness transfer gain signal S15 given from the seventh adder 66, and as well as outputting this to the eighth and ninth subtracters 78 and 79, outputs to the seventh ~the ninth multipliers 81~83 via the fifth up-convert filter 80 at the second transmission rate.

Furthermore, the sixth multiplier 76 multiplies the red signal S4, green signal S5 or blue signal S6 having the maximum level given from the maximum value detection circuit 61 by the third brightness transfer gain signal S15 given from the seventh adder 66 and transmits the resultant brightness transfer red signal S20, brightness transfer green signal S21 or the brightness transfer blue signal S22 to the ninth subtracter 79.

At this point, the eighth subtracter 78 is supplied with clip level signal S52 from the control unit 40. And this eighth subtracter 78 subtracts the transformed luminance signal S16 given from the fifth multiplier from the clip level signal S52 and transmits the subtraction result to the second subtracter 77.

On the other hand, the ninth subtracter 79 subtracts the transformed luminance signal S16 given from the fifth multiplier 75 from the brightness transfer red signal S20, brightness transfer green signal S21 or the luminance transfer blue signal S22 given from the sixth multiplier 76, and outputs the resultant to the second subtracter 77.

Thus, the second divider 77 calculates the saturation transfer gain (Kc) described above by dividing the subtraction result of the clip level signal S52 given from the eighth subtracter 78 and the transformed luminance signal S16 by the subtraction result of the brightness transfer red signal S20, brightness transfer green signal S21 or brightness transfer blue signal S22 and the transformed luminance signal S16, and transmits this to the minimum value detection circuit 84 as the saturation transfer gain signal S17.

The minimum value detection circuit 84 is supplied with the saturation transfer gain signal S55 selected to such as "i" from the control unit 40, and outputs either one having smaller value in the saturation transfer gain signal S55 and the saturation transfer gain signal S17 given from the second divider 77 to the eighth~the tenth adders 86~88 via the sixth up-convert filter 85.

Thus, in the minimum value detection circuit 84, the accidental execution of the processing to disturb the chromatic tone by increasing the saturation can be prevented as in the case of the eighth clip circuit 65 described above.

In this connection, the value of saturation transfer gain signal S55 to be given to the minimum value detection circuit 84 from the control unit 40 can be optionally set. And at the time when it is required to increase the saturation of pixels as necessary, it can cope with easily.

At this point, in the saturation knee processing circuit 36, the arithmetic processing of EQUATIONS (9), (10) and (11) described above from the fifth~the seventh subtracters 72~74 to the eighth~the tenth adders 86~88 can be executed.

More specifically, the fifth~the seventh subtracters 72~74 subtract the corresponding transformed luminance signal S16 given via the fifth up-convert filter 80 from the brightness transfer red signal S20, brightness transfer green signal S21 or the brightness transfer blue signal S22 given from the luminance knee processing circuit 34, and transmit the resulting subtraction result to the corresponding seventh~the ninth multipliers 81~83 respectively.

The seventh~the ninth multipliers 81~83 multiply the subtraction result given from the fifth~the seventh subtracters 72~74 by the corresponding saturation transfer gain signal S17 or S55 given via the sixth up-convert filter 85 and output the resultant to the eighth~tenth adders 86~88.

Moreover, the eighth~the tenth adders 86~88 add up the corresponding transformed luminance signal S16 given via the fifth up-convert filter 80 to the multiplication result given from the seventh~ninth multipliers 81~83, and transmit thus obtained saturation transfer red signal S23, saturation transfer green signal S24 or the saturation transfer blue signal S25 to the corresponding first~the third adders 37~39 respectively.

Accordingly, in the knee processing unit 33, the red signal S4, green signal S5 and blue signal S6 can be knee processed by changing the amount to drop the luminance level according to the saturation of pixels.

(4) Operation and Effects of the Embodiment according to the Present Invention

According to the foregoing construction, in the knee processing unit 33 of the camera signal processing device 1 in the video camera 2, a luminance signal S50 is formed based on the red signal S4, green signal S5 and blue signal S6 and a temporary brightness transfer gain signal S53 is formed based on the red signal S4, green signal S5 or blue signal S6 having the maximum level, and the third brightness transfer gain signal S15 is formed based on these luminance signal S50 and the temporary brightness transfer gain signal S53. Also a saturation transfer gain signal S17 will be formed based on the luminance signal S50, the red signal S4, green signal S5 or blue signal S6 having the maximum level, the clip level signal S52 and the third brightness transfer gain signal S15.

Then, in the case where the red level, green level and/or blue level exceed the clip level after the brightness transfer red signal S20, brightness transfer green signal S21 and brightness transfer blue signal S22 are formed by applying the luminance knee processing to the red signal S4, green signal S5 and blue signal S6 based on the third brightness transfer gain signal S15, the knee processing will be executed by forming the saturation transfer red signal S23, saturation transfer green signal S24 and saturation transfer blue signal S25 applying the saturation knee processing to the brightness transfer red signal S20, brightness transfer green signal S21 and brightness transfer blue signal S22 based on the saturation transfer gain signal S17.

Accordingly, in this camera signal processing unit 1, at the time when the saturation of pixel is high, by opening up the space between the luminance level and the clip level by reducing the luminance level to become lower than the predetermined level, i.e., lower than the clip level, the chromatic fading of pixels can be reduced extensively and the loss of chromatic tone of the image can be prevented. Thus, the knee processing can be conducted bringing it closer to the human sense as compared with the conventional knee processing.

According to the foregoing construction, since as well as forming the luminance signal S50 based on the red signal S4, green signal S5 and blue signal S6, the saturation of pixel is detected, and as well as forming the brightness transfer red signal S20, brightness transfer green signal S21 and brightness transfer blue signal S22 by applying the luminance knee processing to the red signal S4, green signal S5 and blue signal S6 based on said luminance signal S50 and the saturation of the corresponding pixel, the saturation transfer red signal S23, saturation transfer green signal S24 and saturation transfer blue signal S25 are formed by applying the saturation knee processing to the brightness transfer red signal S20, brightness transfer green signal S21 and brightness transfer blue signal S22 based on the saturation transfer gain signal S17 as necessary, the red signal S4, green signal S5 and blue signal S6 can be knee processed by reducing the color fading of pixels, and thus, a video camera capable of improving the quality of picture in the image can be realized.

(5) Other Embodiments

The embodiment described above has dealt with the case of providing low-pass filters 25 and 26, and an interpolation filter 27 in the filter processing unit 21. However, the present invention is not only limited to this but also if red signal S2, green signal S1 and blue signal S3 would be formed not delaying the phase in the first~the third solid state imaging devices 5~7 (not delaying pixel), the filter processing unit can be formed without providing these low-pass filters 25 and 26 and the interpolation filter 27.

Furthermore, the embodiment described above has dealt with the case of knee processing the red signal S4, green signal S5 and blue signal S6 of D1 format. However, the present invention is not only limited to this but also, considering the signal format of the output stage of the video camera 2, red signal, green signal and blue signal of various other formats may be knee processed.

Furthermore, the embodiment described above has dealt with the case of dividing the red signal S4, green signal S5 or blue signal S6 having the maximum level by the clip level signal S52 at the first divider 64. However, the present invention is not only limited to this but also providing a signal conversion table in place of the first divider 64, the division result corresponding to red signal S4, green signal S5 or blue signal S6 with the maximum level may be selected from this conversion table.

Furthermore, the embodiment described above has dealt with the case of applying the present invention to the camera signal processing device 1 provided in the video camera 2. However, the present invention is not only limited to this but also it can be applied to various other video signal processing devices, provided that the device is capable of compression processing red signal, green signal and blue signal.

Furthermore, the embodiment described above has dealt with the case of memorizing the information on the first luminance transfer gain in advance, such as shown in the look-up table 62 of FIG. 4. However, the present invention is not only limited to this but also using the technique of Japan Patent Laid-open H9-331469 (Patent previously applied) since the characteristic of the first luminance transfer gain is a part of the amplitude transmission characteristic, the cumulative frequency distribution showing the frequency of occurrence may be formed based on the luminance signal S50 to be obtained from the luminance detection circuit 60, and this may be used as the first luminance transfer gain considering this as the amplitude transmission characteristic. And thus, images can be obtained with high definition free from black crush and white flicker.

Moreover, if the slant near black code of his amplitude transmission characteristic would be changed as required (i.e., black stretching), black can be adjusted and further refined images can be obtained.

Furthermore, the embodiment described above has dealt with the case of applying the luminance detection circuit 60 as the luminance signal forming means for forming luminance signal based on red signal, green signal and blue signal per pixel of the video signal. However, the present invention is not only limited to this but also can be applied to various other luminance signal forming means.

Furthermore, the embodiment described above has dealt with the case of applying the maximum value detection circuit 61 and the first divider 64 as the detection means for detecting the saturation per pixel of video signal. However, the present invention is not only limited to this but also can be applied to various other luminance signal forming means.

Moreover, the embodiment described above has dealt with the case of applying the look-up table 62, the fourth subtracter 63, the first multiplier 67, the seventh adder 66, and the luminance knee processing circuit 34 as the compression processing means for compression processing red signal, green signal and blue signal of the corresponding pixel by changing the luminance but not changing the hue and saturation of pixel based on the luminance signal formed by the luminance signal forming means and the corresponding detection result obtained by the detection means. However, the present invention is not only limited to this but it can be applied to various other compression processing means.

Furthermore, the embodiment described above has dealt with the case of applying the fifth and sixth multipliers 75 and 76, the second divider 77, the eighth and ninth subtracters 78 and 79, the minimum value detection circuit 84 and saturation knee processing circuit 36 as the control means for controlling the signal level of red signal, green signal and blue signal compression processed by the compression processing means as required without changing the hue and luminance of pixels but changing the saturation. However, the present invention is not only limited to this but also it can be applied to various other adjusting means.

Furthermore, the embodiment described above has dealt with the case of applying the look-up table 62, the fourth subtracter 63, the first multiplier 67 and the seventh adder 66 as the correction means for selecting the compression ratio corresponding to the luminance signal formed by the luminance forming means from the prescribed amplitude transmission feature that changes corresponding to the signal level of luminance signal and for correcting the selected compression ratio based on the corresponding detection result obtained by the detection means. However, the present invention is not only limited to this but also it can be applied to various other correction means.

Furthermore, the embodiment described above has dealt with the case of applying the luminance knee processing circuit 34 as the compression means for compression processing said red signal, green signal and blue signal multiplying said red signal, green signal and blue signal of the corresponding pixel by the compression ratio corrected by the correction means. However, the present invention is not only limited to this but also it is applicable to various other compression means.

According to the present invention as described above, in the video signal processing device, since we provide the luminance signal forming means for forming luminance signal of pixel based on red signal, green signal and blue signal per pixel of the video signal; the detection means for detecting the saturation per pixel of video signal; the compression processing means for compression processing red signal, green signal and blue signal of the corresponding pixel without changing the hue and saturation of pixel but only changing the luminance based on the luminance signal formed by the luminance signal forming means and the corresponding detection result obtained by the detection means, and the control means for controlling signal levels of red signal, green signal and blue signal compression processed by the compression processing means as required by changing the saturation but not changing the hue and luminance of pixel; the red signal, green signal and blue signal can be compression coded with extremely reduced chromatic color fading of pixel and the image can be prevented from losing the chromatic tone. Thereby the video signal processing device capable of improving the quality of picture in the image can be realized.

Furthermore, according to the video signal processing method, since we provide the first step for forming luminance signal of pixel based on red signal, green signal and blue signal per pixel of video signal and for detecting the saturation per pixel of said video signal; the second step for compression processing the red signal, green signal and blue signal of the corresponding pixel only changing the luminance but not changing the hue and saturation of pixel based on the luminance signal obtained at the first step and the corresponding detection result; and the third step for controlling signal levels of red signal, green signal and blue signal compression processed at the second step as required just changing the saturation but not changing the hue and luminance of pixel; the red signal, green signal and blue signal can be compression coded with extremely reduced chromatic color fading of pixels and the image can be prevented from losing the chromatic tone. Thus, the video signal processing method capable of improving the quality of picture in the image can be realized.

In the embodiments, the brightness matrix is set in each equation at 0.30R+0.59G+0.11B according to the chromaticity level by NTSC (National Television System Committee), but other chromaticity levels are also applicable with only differing coefficients.

INDUSTRIAL APPLICABILITY

The present invention can be applied to a video signal processing device which compression processes a red signal, green signal and blue signal from such as a camera signal processing device provided in a video camera.

What is claimed is:

1. A video signal processing device for maintaining signal levels of one or more red signals, one or more green signals and one or more blue signals per pixel of a video signal under a predetermined reference level, comprising:

luminance signal forming means for forming a luminance signal of said pixel based on said red signal, green signal and blue signal per said pixel of said video signal;

detection means for detecting saturation of said pixel of said video signal;

compression processing means for compression processing said red signal, green signal and blue signal of the corresponding pixel without changing hue and saturation of said pixel but changing brightness based on said luminance signal formed by said luminance signal forming means and the corresponding detection result obtained by said detection means;

control means for controlling the signal levels of said red signal, green signal and blue signal compression processed by said compression processing means without changing said hue and said brightness of said pixel but changing said saturation;

first generating means for generating a first brightness transfer gain signal;

second generating means for generating a second brightness transfer gain signal; and third generating means for generating a third brightness transfer gain signal as a function of the first brightness transfer gain signal and the second brightness transfer gain signal, whereby said device is operable to compression process selected pixels by performing, for each such selected pixel, two luminance knee processing operations followed by a saturation knee processing operation, wherein the two luminance knee processing operations are performed as a function of the third brightness transfer gain signal.

2. The video signal processing device according to claim 1, wherein said compression processing means increases the compression ratio of said red signal, green signal and blue signal as the saturation of said pixel increases.

3. The video signal processing device according to claim 1, wherein said compression processing means further comprises:

correction means for selecting the compression ratio corresponding to said luminance signal formed by said luminance signal forming means from the predetermined amplitude transmission characteristic changing corresponding to the signal level of said luminance signal and for correcting said selected compression ratio based on the corresponding detection result obtained by said detection means; and compression means for compression processing said red signal, green signal and blue signal by multiplying said red signal, green signal and blue signal of the corresponding pixel by said compression ratio corrected by said correction means respectively.

4. The video signal processing device according to claim 3, wherein said amplitude transmission characteristic is formed of the knee effect showing gains for compressing said luminance signal.

5. The video signal processing device according to claim 3, wherein said amplitude transmission characteristic is the cumulative distribution of the occurrence frequency of said signal level of said luminance signal.

6. A video signal processing method for maintaining signal levels of one or more red signals, one or more green signals and one or more blue signals per pixel of a video signal under a predetermined reference level, comprising:

forming a luminance signal of said pixel based on said red signal, green signal and blue signal per said pixel of said video signal;

detecting saturation of said pixel of said video signal;

compression processing said red signal, green signal and blue signal of the corresponding pixel without changing hue and saturation of said pixel but changing the brightness based on said luminance signal obtained at the forming step;

controlling said signal level of said red signal, green signal and blue signal processed at the compression processing step without changing hue and luminance of said pixel but changing said saturation;

generating a first brightness transfer gain signal;

generating a second brightness transfer gain signal; and generating a third brightness transfer gain signal as a function of the first brightness transfer gain signal and the second brightness transfer gain signal;

whereby said method is operable to compression process selected pixels by performing, for each such selected pixel, two luminance knee processing operations, as a function of the third brightness transfer gain signal, followed by a saturation knee processing operation.

7. The video signal processing method according to claim 6, wherein in said compression processing the compression ratio of said red signal, green signal and blue signal increases as the saturation of said pixel increases.

8. The video signal processing method according to claim 6, wherein in said compression processing step the compression ratio is selected from a prescribed amplitude transmission characteristic changing corresponding to the signal level of said luminance signal corresponding to said luminance signal formed at said forming step, said selected compression ratio is corrected based on the corresponding detection result obtained at the forming, and said red signal, green signal and blue signal are compression processed by multiplying said red signal, green signal and blue signal of the corresponding pixel by said corrected compression ratio.

9. The video signal processing method according to claim 8, wherein said amplitude transmission characteristic is formed of knee effect showing gains for compression processing said luminance signal.

10. The video signal processing method according to claim 8, wherein said amplitude transmission characteristic is formed of the cumulative distribution of the occurrence frequency of said signal level of said luminance signal.

* * * * *